(12) United States Patent
Badart et al.

(10) Patent No.: US 11,159,438 B1
(45) Date of Patent: Oct. 26, 2021

(54) SYSTEM AND METHOD FOR NETFLOW AGGREGATION OF DATA STREAMS

(71) Applicant: Booz Allen Hamilton Inc., McLean, VA (US)

(72) Inventors: William Hall Badart, Washington, DC (US); Jeffrey M. Liott, Georgetown, TX (US); Gregory P. McCullough, Austin, TX (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

(21) Appl. No.: 17/245,454

(22) Filed: Apr. 30, 2021

(51) Int. Cl.
*H04L 12/891* (2013.01)
*H04L 12/851* (2013.01)
*H04L 12/741* (2013.01)

(52) U.S. Cl.
CPC .............. *H04L 47/41* (2013.01); *H04L 45/74* (2013.01); *H04L 47/2483* (2013.01)

(58) Field of Classification Search
None
See application file for complete search history.

(56) References Cited

U.S. PATENT DOCUMENTS

| | | | |
|---|---|---|---|
| 7,120,931 B1* | 10/2006 | Cheriton | H04L 63/0227 726/13 |
| 9,001,661 B2* | 4/2015 | Zuk | H04L 63/0227 370/235 |
| 2010/0260181 A1* | 10/2010 | Chang | H04L 69/32 370/390 |
| 2015/0039751 A1* | 2/2015 | Harrigan | H04L 43/045 709/224 |

\* cited by examiner

*Primary Examiner* — Anh Ngoc M Nguyen
(74) *Attorney, Agent, or Firm* — Buchanan Ingersoll & Rooney PC

(57) ABSTRACT

Disclosed is a system for processing data streams that includes a parallel processor and a netflow aggregator module to generate a storage representation for data packets. Each storage representation includes segments of information about the data packet, the segments of information including information about a communication protocol specification related to the data packet. The netflow aggregator module generates a composite index to identify a data packet association characteristic for each data packet and stores the composite index in a segment of the storage representation. The netflow aggregator module groups data packets by their composite index. The netflow aggregator module generates a session flow identifier by identifying a beginning and/or end of a transmission netflow for each data packet having the same data packet association characteristic. The netflow aggregator module aggregates and orders the data packets having the same session flow identifiers into a flow channel.

20 Claims, 5 Drawing Sheets

200

| Frame_number | Ip_src | Tcp_srcport | Ip_dst | Tcp_dstport | Tcp_flags_syn | Tcp_flags_fin |
|---|---|---|---|---|---|---|
| 0 | 50 | 8080 | 51 | 443 | 1 | 0 |
| 1 | 51 | 8881 | 52 | 22 | 1 | 0 |
| 2 | 51 | 443 | 50 | 8080 | 0 | 0 |
| 3 | 51 | 443 | 50 | 8080 | 0 | 1 |
| 4 | 50 | 8080 | 51 | 443 | 1 | 0 |
| 5 | 51 | 8881 | 52 | 22 | 0 | 0 |
| 6 | 51 | 443 | 50 | 8080 | 0 | 1 |
| 7 | 50 | 8080 | 51 | 443 | 1 | 0 |
| 8 | 51 | 8881 | 52 | 22 | 0 | 1 |
| 9 | 51 | 443 | 50 | 8080 | 0 | 1 |

| Frame_number | Ip_src | Tcp_srcport | Ip_dst | Tcp_dstport | Tcp_flags_syn | Tcp_flags_fin | Composite_index |
|---|---|---|---|---|---|---|---|
| 0 | 50 | 8080 | 51 | 443 | 1 | 0 | 9407839479744650038539 |
| 1 | 51 | 8881 | 52 | 22 | 1 | 0 | 9592306920525220041366 |
| 2 | 51 | 443 | 50 | 8080 | 0 | 0 | 9407839479744650038539 |
| 3 | 51 | 443 | 50 | 8080 | 0 | 1 | 9407839479744650038539 |
| 4 | 50 | 8080 | 51 | 443 | 1 | 0 | 9407839479744650038539 |
| 5 | 51 | 8881 | 52 | 22 | 0 | 0 | 9592306920525220041366 |
| 6 | 51 | 443 | 50 | 8080 | 0 | 1 | 9407839479744650038539 |
| 7 | 50 | 8080 | 51 | 443 | 1 | 0 | 9407839479744650038539 |
| 8 | 51 | 8881 | 52 | 22 | 0 | 1 | 9592306920525220041366 |
| 9 | 51 | 443 | 50 | 8080 | 0 | 1 | 9407839479744650038539 |

| Frame_number | Ip_src | Tcp_srcport | Ip_dst | Tcp_dstport | Tcp_flags_syn | Tcp_flags_fin | Composite_index | Flow_Id |
|---|---|---|---|---|---|---|---|---|
| 0 | 50 | 8080 | 51 | 443 | 1 | 0 | 9407839479744659028539 | 1 |
| 2 | 51 | 443 | 50 | 8080 | 0 | 0 | 9407839479744659028539 | 1 |
| 3 | 51 | 443 | 50 | 8080 | 0 | 1 | 9407839479744659028539 | 1 |
| 4 | 50 | 8080 | 51 | 443 | 1 | 0 | 9407839479744659028539 | 2 |
| 6 | 51 | 443 | 50 | 8080 | 0 | 1 | 9407839479744659028539 | 2 |
| 7 | 50 | 8080 | 51 | 443 | 1 | 0 | 9407839479744659028539 | 3 |
| 9 | 51 | 443 | 50 | 8080 | 0 | 1 | 9407839479744659028539 | 3 |
| 1 | 51 | 8881 | 52 | 22 | 1 | 0 | 9592306920525220413660 | 1 |
| 5 | 51 | 8881 | 52 | 22 | 0 | 0 | 9592306920525220413660 | 1 |
| 6 | 51 | 8881 | 52 | 22 | 0 | 1 | 9592306920525220413660 | 1 |

FIG. 4

SYSTEM AND METHOD FOR NETFLOW AGGREGATION OF DATA STREAMS

FIELD

Embodiments relate to systems and methods to process data streams by segmenting them into data packet transmission netflows that are more conducive for parallel processing.

BACKGROUND INFORMATION

Limited analytical capabilities, especially at or near where the data is generated, complicate challenges around detection of sophisticated cyberattacks. This prevents operators from sufficiently understanding the nature and severity of cyber incidents. As a result, analysts are often required to defer processing and analytical tasks until after the current task at-hand is completed. This is because operations at the edge are generally limited in computational resources. Post-mission operations, however, can use data collected on-mission with larger computing environments and scalable analytical systems in enterprise environments.

Such an operational workflow can be inadequate for many situations. For instance, a situation in which detection and analysis of cyberattacks are time sensitive (e.g., missions that define success by loss of life potential) cannot rely on such an operational workflow. Consequently, "flyaway" kits (e.g., a computer device configured for cyber incident detection and analytics) are deployed to the edge to perform such analytics. Conventional flyaway kits are limited by their central processing unit (CPU) architecture, which do not have sufficient processing bandwidth for operators to indiscriminately process all data collected (e.g., terabytes (TBs) worth of data) at mission pace. Thus, while current flyaway kits are able to assist in cyber analytics at the edge, operators must either selectively ingest data they hope will be representative and relevant, or they must focus their mission on data collection and conduct analysis after the fact using larger computer systems. This often results in hours of wasted effort and fruitless analysis.

SUMMARY

Embodiments disclosed herein relate to a device that is able to process telecommunication data in a parallel processing manner with reduced computational resource allocation and faster processing of relevant data for cyber incident analytics. This is achieved via a netflow aggregating algorithm that segments and organizes telecommunication data in tables or other forms of storage representation that are conducive for parallel processing, e.g., it collects data packets and summarizes them into more cogent information. Thus, an edge computing device (e.g., a flyaway kit) can use parallel processing (e.g., using a graphics processing unit (GPU)) to process a large amount of data in a short period.

Mission constraints on size, weight, durability, power usage, and connectivity severely limit the scalability of processing tools on a flyaway kit. Conventional high-powered compute tools require either large hardware systems or distributed, multi-node environments (often hosted on enterprise systems or in the cloud), making them unsuitable, for example, for military tactical environments. Yet, by designing a netflow aggregator engine around a messaging service/data broker, embodiments disclosed herein reduce technical complexity and increase modularity by eliminating the 'many-to-many' service connection points that have become common in cyber defensive architecture. This design also allows for data to be ingested from a variety of data sources, fused, and normalized into one common data model.

As mentioned above, flyaway kits are physically constrained by mission requirements. This means that to scale up to bigger input data, operators cannot simply incorporate more machines ("horizontal scaling," the approach exemplified by "elastic compute" cloud services). This typically means spending critical mission time offloading data to an actual datacenter. Parallel processing (e.g., use of parallel processors such as GPUs), however, offers the needed computing bandwidth in a portable form factor. With parallel processing and the disclosed netflow aggregator module, operators can do more of their investigation in the field immediately as data is available.

The disclosed netflow aggregation algorithm can exploit parallelism in parallel processors, such as GPUs, for orders of magnitude better throughput than conventional flyaway kits operating on CPUs. The disclosed netflow aggregator summarizes captured packets in terms of communications and behaviors. This allows for disentangling interleaved streams of related packets in batches, wherein each packet capture is treated as a data frame. This facilitates implementing packet collation in terms of frame aggregations, joins, and queries. In addition, unmatched packets can be recycled into a next batch (e.g., a given batch of Packet Capture (PCAP) might not include all the packets for every netflow; packets belonging to incomplete netflows can be fed back into the system with the next batch of PCAP, where the remainder of their netflow can be found or otherwise re-recycled or discarded). The result is >100× improvement in processing speed over a comparable CPU baseline.

An exemplary embodiment relates to a system for processing data streams. The system includes a parallel processor configured to collect data streams of one or more data packets. The system includes a netflow aggregator module configured to generate a storage representation for at least one of the one or more data packets. Each storage representation of a data packet includes segments of information about the data packet. At least one of the segments of information about the data packet is information about a communication protocol specification related to the data packet. The netflow aggregator module is configured to generate a composite index to identify a data packet association characteristic for each of the one or more data packets and store the composite index in one or more segments of the storage representation for that data packet, the generating and storing of the composite index occurring in parallel. The netflow aggregator module is configured to group data packets by their composite index, the grouping occurring in parallel. The netflow aggregator module is configured to generate a session flow identifier by identifying a beginning and/or an end of a transmission netflow for each grouping of the one or more data packets. The netflow aggregator module is configured to aggregate and order the data packets having the same session flow identifier into a netflow channel, the aggregating and ordering occurring in parallel.

An exemplary method for processing data streams involves generating a storage representation for at least one of one or more data packets. Each storage representation of a data packet includes segments of information about the data packet. At least one of the segments of information about the data packet is information about a communication protocol specification related to the data packet. The method involves generating a composite index that identifies a data packet association characteristic for each of the one or more data packets and storing the composite index in one or more segments of the storage representation for that data packet, the generating and storing of the composite index occurring in parallel. The method involves grouping data packets by their composite index, the grouping occurring in parallel. The method involves generating a session flow identifier by identifying a beginning and/or an end of a transmission netflow for each of the groupings of the one or more data packets having the same session flow identifier. The method involves aggregating and ordering the data packets having the same session flow identifiers into a netflow channel, the aggregating and ordering occurring in parallel.

BRIEF DESCRIPTION OF THE DRAWINGS

Other features and advantages of the present disclosure will become more apparent upon reading the following detailed description in conjunction with the accompanying drawings, wherein like elements are designated by like numerals, and wherein:

FIG. 2 shows an exemplary storage representation in the form of a table;

FIG. 3 shows an exemplary storage representation in which a composite index is generated to identify data packet association characteristics;

FIG. 4 shows an exemplary storage representation in which a session flow identifier is generated to identify a beginning and an end of a transmission netflow for a grouping of data packets.

DETAILED DESCRIPTION

Figure 1:
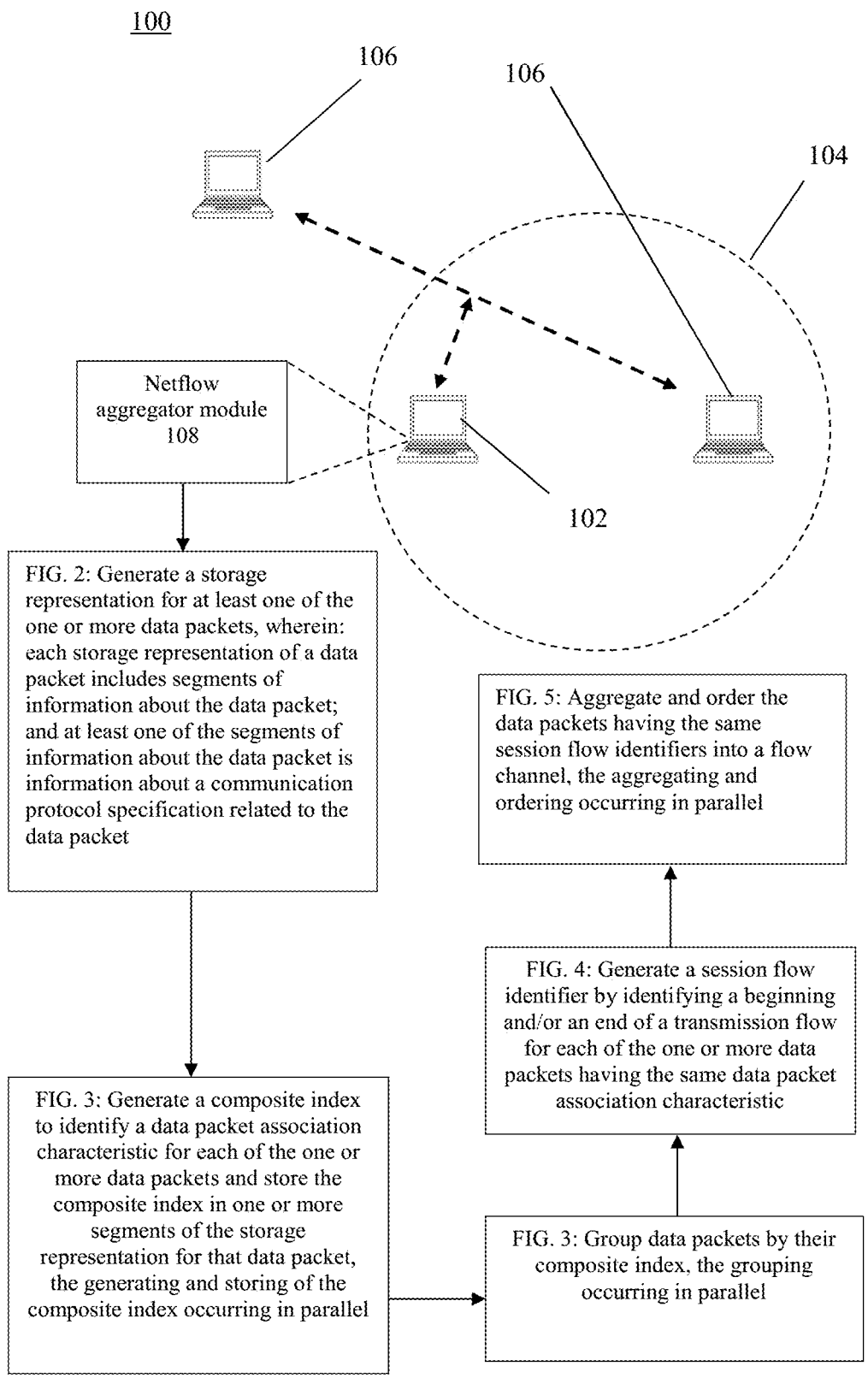
FIG. 1 shows an exemplary system configuration for processing data streams.

Referring to FIGS. 1-5, embodiments relate to a system 100 for processing data streams. The data streams can include data packets representative of attributes of the data streams. The system 100 can include a parallel processor 102 configured to collect data streams of one or more data packets. The parallel processor 102 can be a computer device, for example, having a processor configured for parallel processing. The computer device may be configured as a flyaway kit—a computer device configured for cyber incident detection and analytics. In this regard, the computer device can include communication interface components (e.g., modems, gateways, transceivers, routers, antennas, digitizers, switches, filters, amplifiers, waveguides, etc.) to connect to a communication network 104 (e.g., to establish itself as a node on the communication network 104) and facilitate collecting and monitoring data streams to and from other nodes 106 on the communication network 104. The data streams can include inter-network and/or intra-network telecommunication traffic. This can include collecting and monitoring data streams to/from nodes 106 within the communication network 104 and/or nodes 106 outside of the communication network 104. For instance, the parallel processor 102 may collect and monitor data streams between two or more nodes 106 within the communication network 104, or at least one node 106 within the communication network 104 and at least one node 106 outside of the communication network 104. Collection and monitoring of data streams can be achieved through transmissions via a communication link. The communication link can be electronic-based, optical-based, opto-electronic-based, quantum-based, etc.

While embodiments describe the computer device being configured as a network edge computer device, embodiments are not limited thereto. For instance, the computer device can also be deployed centrally.

An exemplary parallel processor 102 can be a graphics processing unit (GPU). An exemplary GPU is a Tesla V100S. A GPU is a parallel processing unit with several hundreds or thousands of very simple operating cores (e.g., CUDA cores) running in parallel. A central processing unit (CPU), on the other hand, may have (typically not more than) sixty-four very complex cores. It should be noted that some embodiments may include use of a CPU and/or other non-CPU processors (e.g., Field Programmable Gate Arrays (FPGAs), Tensor Processing Units (TPUs), etc.) in addition to an embodiment of the parallel processor 102, i.e., the computer device can include at least one parallel processor 102 and at least one other type of processor. The CPU or other processor can be used to augment processing tasks for the parallel processor 102, perform processing tasks ancillary to the processing the parallel processor 102 is being tasked to perform, operate to dispatch work to the parallel processor 102, etc.

The computer device can also include memory for volatile or non-volatile storage of data. In particular, the memory may store embodiments of the netflow aggregation algorithm (embodied in a netflow aggregator module 108) from which the parallel processor 102 receives instructions for execution. Thus, the parallel processor 102 can be in operative association with the memory. The memory can be computer readable memory configured to store data. The memory can include volatile, transitory memory (e.g., Random Access Memory (RAM)), and be embodied as an in-memory, an active memory, a cloud memory, etc. Embodiments of the memory can include a processor module and other circuitry to allow for the transfer of data to and from the memory, which can include to and from other components of the computer device. This transfer can be via hardwire or wireless transmission.

The system 100 includes a netflow aggregator module 108. The netflow aggregator module 108 can be a software or firmware operating module configured to perform data stream netflow aggregation to allow the parallel processor 102 to generate a storage representation 200 for at least one of the one or more data packets. Each storage representation 200 of a data packet includes segments of information about the data packet. At least one of the segments of information about the data packet is information about a communication protocol specification related to the data packet.

A key aspect of the netflow aggregator module 108 is to aggregate the data stream data to allow the parallel processor 102 to operate on frame data (metadata of a data packet, packet label data, etc.) of the data packets. The storage representation 200 provides access to the frame data. For instance, an exemplary implementation generates a table as the storage representation 200. The table has plural rows and plural columns. Each row can represent a data packet and each column can include information about a communication protocol specification related to the data packet.

The netflow aggregator module 108 is configured to generate a composite index to identify a data packet association characteristic for each of the one or more data packets and store the composite index in one or more segments of the storage representation 200 for that data packet. The generating and storing of the composite index occur in parallel via the parallel processor 102. Sticking with the table example, a composite index for each row can be generated that identifies a communication node 106 pair for the data packet. For instance, the netflow aggregator module 108 can use metadata from each data packet's Internet Protocol (IP) and Transmission Control Protocol (TCP) headers (e.g., if the data packets are TCP/IP-specific) to assess which other packets might belong to the same unit of communication. Because the netflow aggregator module 108 only relies on this metadata (and not, for example, on a packet's payload), the process of reducing full packet capture (PCAP) to a structured representation of this metadata is not required. This composite index is a value assigned to data packets being transmitted between two nodes 106. The composite index identifies the nodes 106 between which the data packets are being transmitted and assigns a value that is independent of the direction of travel.

The netflow aggregator module 108 is configured to group data packets by their composite index, again the grouping occurring in parallel by the parallel processor 102.

The netflow aggregator module 108 is configured to generate a session flow identifier by identifying a beginning and/or an end of a transmission netflow for each grouping of the one or more data packets having the same data packet association characteristic.

The netflow aggregator module 108 is configured to aggregate and order the data packets having the same session flow identifiers into a flow channel, again the aggregating and ordering occurring in parallel. The ordering can be based on any binary operation that induces a total ordering of a set of data packets. This can include using an order in which the data packets are received, time stamping, sequence number assignment, etc. It should be noted that the netflow aggregator module 108 can also compute arbitrary statistics over each aggregate. These can include total bytes sent (forward, backward, total), average bytes per packet, number of packets sent (forward, backward, total), average inter-arrival time (if timestamps are used), netflow duration (if timestamps are used), etc. These data can be included in the storage representation 200.

This aggregation method allows the data stream data to be aggregated by transmission netflows that occur between nodes 106—the data is packaged for quick, efficient, and accurate processing for the purposes of cyber incident analytics. This also allows the amount of data frames to be processed from a data stream to be maximized. Because the processing will be less computationally taxing, parallel processing of the data can be availed. Because the system 100 tabularizes batches of data streams (it summarizes network 104 communications that are described by a series of captured packets), the batches can then be processed in parallel. With conventional systems, and particular those using CPUs, the system must review the entire data stream (not just the ones falling within a transmission netflow between two nodes 106), segment the data stream, and pull metadata for compilation. This type of operation is very computationally taxing, fails to take maximum advantage of parallel processing capabilities, and requires long processing times. Table 1 shows test results of an embodiment of the system 100 as compared to a system that relies on CPU processing.

TABLE 1

Performance Results

| Benchmark | Performance |
| --- | --- |
| GPU Optimized Algorithm on GPU vs. GPU Optimized Algorithm on CPU | <15 seconds vs. 20+ minutes (>100×) |
| GPU Optimized Algorithm on GPU vs. CPU Optimized Algorithm on CPU | 10 seconds vs. 66 seconds (6.6×) |

As noted herein, the storage representation 200 can be one or more tables. A segment of information about a data packet can be stored in one or more intersections of one or more rows and one or more columns. At least one of the rows can represent a data packet from a collected data stream. The columns can include information about a communication protocol specification related to the data packet. These can include, for example, IP addresses for the source host and/or the destination host for the communication node 106 pair and/or User Datagram Protocol (UDP) or Transmission Control Protocol (TCP) ports identifying a source process and/or a destination process for the communication node pair. The columns may also include whether the SYN bit or the FIN bit was set for each data packet. SYN is short for synchronize, which is a TCP packet sent from an originator node 106 to a receiving node 106 requesting that a connection be established between them. If the SYN is received by a receiving node 106, a SYN/ACK (synchronize acknowledgement) is sent back to the SYN sending node 106. If the originator node 106 receives the SYN/ACK, a final ACK is sent. FIN is short for finish (FIN), which is a TCP packet sent to request connection termination. Sending a FIN will initiate shutdown for the connection, but the actual last packet sent will be an ACK (assuming no errors). As will be explained, these metadata can be used to identify a transmission session between nodes 106. While these metadata are discussed for exemplary purposes, it should be understood that other metadata attributes can be included as columns, such as frame length for example. The more metadata attributes, the richer the statistical analysis can be.

IP addresses can be assumed to be version 4 and 32-bit unsigned integers. TCP ports can be assumed to be 16-bit unsigned integers. TCP flags can be assumed to be Boolean (e.g., 1-bit unsigned integers). It should be noted that frame number is loosely based on TCP's sequence number, but itself is not specific to TCP or IP, and is a 64-bit signed integer. It is contemplated that the netflow aggregator module 108 can cast "stringified" IP addresses (e.g., "127.0.0.1") to the corresponding 32-bit integer for processing.

It should also be noted that metadata other than IP address can be used to identify the source and destination nodes of a data packet. For instance, hostname can be used to uniquely identify the sender or receiver nodes. In addition, a User Datagram Protocol (UDP) port may be used rather than a TCP port to determine which processes are in communication at the host. Using UDP may require acquisitioning additional metadata to delineate netflows (e.g., timestamps), as UDP does not have SYN/ACK/FIN.

With embodiments of the storage representation 200 being in the form of a table, the netflow aggregator module 108 can compute a composite index for each data packet (e.g., each row). The composite index can be generated for each data packet in parallel, which can limit the number of simple processor cores of the parallel processor 102 being used at any given time. The purpose of generating and assigning the composite index is to identify the pair of nodes 106 between which a data packet was sent, and to assign the same value to data packets of that node pair regardless of which direction a data packet traveled. For instance, communication protocols have mechanics that swap address information (e.g., when host A sends a packet to B, A is listed as the source, but in the packet B sends in reply, B will be the source), and the composite index uses the higher and lower port/address values, leading to the composite index having the same value even with swapped origins. Hence, the composite index is generated to identify communication node 106 pairs, and as will be explained later, the communication node 106 pairs along with the composite index are used to identify transmission session netflow.

The composite index of a data packet can be given by the following expression:

$$\min(ip_{src}, ip_{dst}) + \max(ip_{src}, ip_{dst}) + \min(port_{src}, port_{dst}) + \max(port_{src}, port_{dst})$$

where + indicates bit-string concatenation.

When included in the table, each data packet (e.g., each row) sharing the same composite index is identified and grouped. Generally, captured data packets often have frames from numerous interleaved nodes 106. With inclusion of the composite index, the system 100 can sort and group the frames into discrete address/port channels.

The netflow aggregator module 108 is configured to sort the table by composite index and session flow identifier. This step identifies the transmission session netflow for each data packet (each row). The netflow aggregator module 108 then creates a session flow identifier for each row. A session can be identified from the data packet association characteristics of the beginning and/or the end of each transmission netflow that can be extracted from TCP header data of the data packet. For instance, a cumulative sum of SYN bits in rows where ACK=0 from the TCP header data can be used (with the composite index) to estimate to which communication unit a data packet belongs, wherein a session begins by a first SYN packet encountered and ends when a subsequent FIN/ACK sequence is encountered. The system 100 can then group data packets to a set of sessions, each session beginning with receiving a first SYN packet and ending with receiving a subsequent FIN packet. A session flow identifier is generated for each identified session flow. The table can then be sorted by both session flow identifier and composite index (see FIG. 4).

Figure 5:
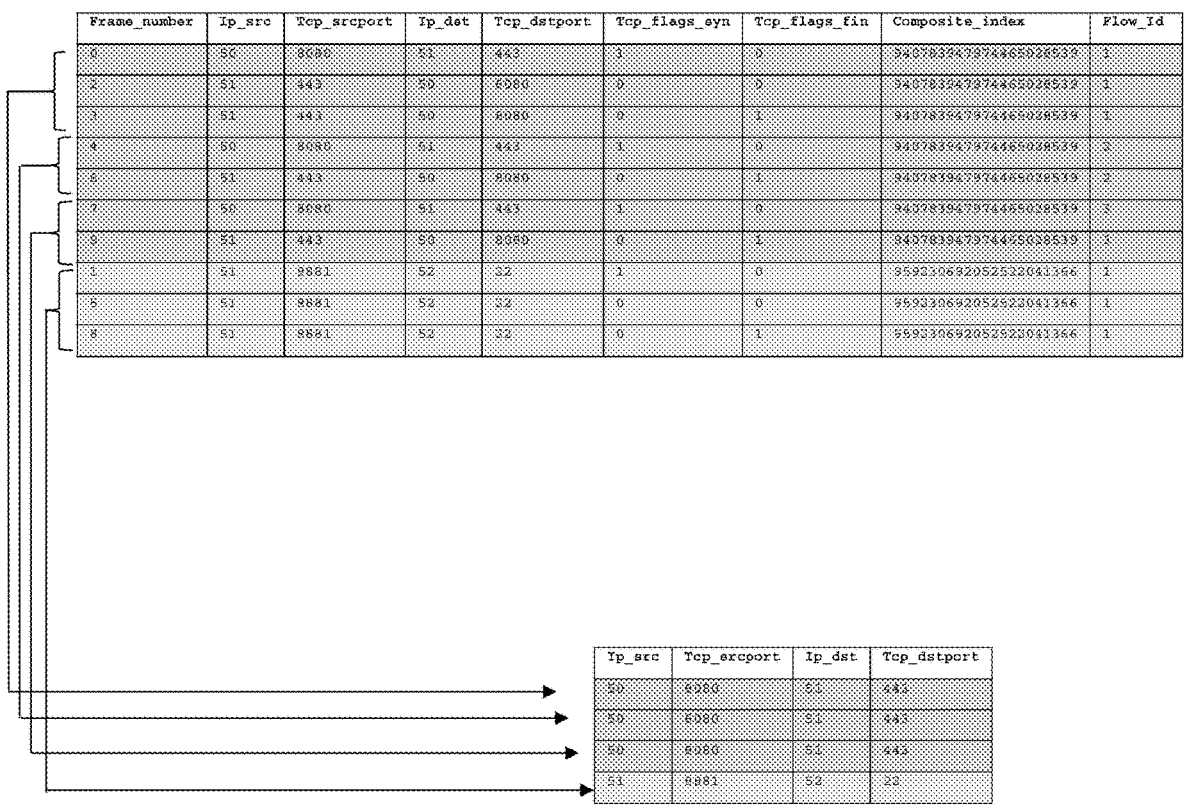
FIG. 5 shows an exemplary storage representation in which aggregation and ordering of data packets having the same session flow identifiers into flow channels has occurred.

With the table in this configuration, the data packets are aggregated and ordered. For instance, data packets having the same session flow identifiers can be aggregated and ordered into flow channels. Thus, the netflow aggregator module 108 generates a new storage representation 200 having at least one row that is populated to represent a flow channel and the metadata and statistics associated with it. Now each flow channel can be processed individually, i.e., processing in parallel via the parallel processor 102. As can be seen in FIG. 5, it is much easier and computationally efficient to analyze and process data packets when grouped to flow channels.

The length of data streams or delays during the course of transmitting data packets of a data stream can cause data packets of that data stream to arrive at the receiving node prior to the receiving node initiating capture of the data stream, or data packets of a data stream may arrive at the receiving node after the capture of the data packets of that data stream has closed. To address these transmission situations, sessions can begin when the first packet is seen in a channel. The system can retain frames that are not in sessions between input data frames. These retained frames can be included in subsequent processing. For instance, a data packet can be received but then there may be a connectivity issue that causes a break in communication between two communication nodes 106. After connectivity is re-established, the receiving communication node 106 may receive duplicate data packets, or any of the transmission situations discussed above may occur. Protocols can be established that select one data packet of a duplicate data packet set. Another transmission situation can involve receiving a data packet stream having a missing frame. Protocols can be established to hold a frame or a plurality of frames in a buffer pending receipt in a subsequent transmission. Such protocols are well known methods of addressing such transmission situations.

In an exemplary implementation, a method for processing data streams can involve generating a storage representation 200 for at least one of one or more data packets. Each storage representation 200 of a data packet includes segments of information about the data packet. At least one of the segments of information about the data packet is information about a communication protocol specification related to the data packet. The method can involve generating a composite index that identifies a data packet association characteristic for each of the one or more data packets and storing the composite index in one or more segments of the storage representation 200 for that data packet, the generating and storing of the composite index occurring in parallel. The method can involve grouping data packets by their composite index, the grouping occurring in parallel. The method can involve generating a session flow identifier by identifying a beginning and, optionally, an end of a transmission netflow for a data stream of the one or more data packets having the same data packet association characteristic. The method can involve aggregating and ordering the data packets having the same session flow identifiers into a flow channel, the aggregating and ordering occurring in parallel.

In some embodiments, the method involves generating the storage representation 200 as one or more tables, wherein a segment of information about a data packet is stored in one or more intersections of one or more rows and one or more columns.

In some embodiments, the method involves sorting the table by composite index and session flow identifier.

In some embodiments, the method involves tabulating whether a synchronize (SYN) transmission control protocol (TCP) packet bit or a finish (FIN) TCP packet bit is present in at least one of the one or more data packets of a data stream.

In some embodiments, the grouping of data packets involves grouping at least one of the one or more data packets having the same composite index.

In some embodiments, the method involves identifying a communication node pair between which at least one of the one or more data packets is transmitted and generating the composite index so that at least one of the one or more data packets of the communication node pair has the same composite index value regardless of transmission direction.

It will be understood that modifications to the embodiments disclosed herein can be made to meet a particular set of design criteria. For instance, any of the components of the system 100 can be any suitable number or type of each to meet a particular objective. Therefore, while certain exemplary embodiments of the system 100 and methods of using the same disclosed herein have been discussed and illustrated, it is to be distinctly understood that the invention is not limited thereto but can be otherwise variously embodied and practiced within the scope of the following claims.

It will be appreciated that some components, features, and/or configurations can be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiments. Thus, the components, features, and/or configurations of the various embodiments can be combined in any manner and such combinations are expressly contemplated and disclosed by this statement.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning, range, and equivalence thereof are intended to be embraced therein. Additionally, the disclosure of a range of values is a disclosure of every numerical value within that range, including the end points.

What is claimed is:

1. A system for processing data streams, the system comprising:
    a parallel processor configured to collect data streams of one or more data packets;
    a netflow aggregator module configured to:
        generate a storage representation for at least one of the one or more data packets, wherein:
            each storage representation of a data packet includes segments of information about the data packet; and
            at least one of the segments of information about the data packet is information about a communication protocol specification related to the data packet;
        generate a composite index to identify a data packet association characteristic for each of the one or more data packets and store the composite index in one or more segments of the storage representation of that data packet, the generating and storing of the composite index occurring in parallel;
        group data packets by their composite index, the grouping occurring in parallel;
        generate a session flow identifier for each grouping by identifying a beginning and/or an end of a transmission netflow for the one or more groupings, where each grouping is comprised of data packets having the same data packet association characteristic; and
        aggregate and order the data packets having the same session flow identifiers into a flow channel, the aggregating and ordering occurring in parallel.

2. The system recited in claim 1, wherein:
    the storage representation is one or more tables and a segment of information about a data packet is stored in one or more intersections of one or more rows and one or more columns.

3. The system recited in claim 2, wherein the netflow aggregator module is configured to:
    sort the table by composite index and session flow identifier.

4. The system recited in claim 1, wherein:
    the parallel processor includes plural simple processing cores.

5. The system recited in claim 1, wherein:
    the parallel processor includes one or more graphics processing units (GPUs).

6. The system recited in claim 1, wherein:
    the data packet association characteristic is a communication node pair.

7. The system recited in claim 6, wherein:
    the communication protocol specification includes Internet Protocol (IP) addresses for a source host and/or a destination host for the communication node pair and/or User Datagram Protocol (UDP) or Transmission Control Protocol (TCP) ports identifying a source process and/or a destination process for the communication node pair.

8. The system recited in claim 1, wherein:
    the communication protocol specification includes whether a synchronize (SYN) transmission control protocol (TCP) packet bit or a finish (FIN) TCP packet bit is present for at least one of the one or more data packets.

9. The system recited in claim 1, wherein:
    the netflow aggregator module is configured to group at least one of the one or more data packets having the same composite index.

10. The system recited in claim 6, wherein:
    the netflow aggregator module is configured to identify the communication node pair between which at least one of the one or more data packets is transmitted and generate a composite index that is stored in the data representation of the at least one of the one or more data packets of the communication node pair regardless of transmission direction.

11. The system recited in claim 1, wherein:
    the netflow aggregator module is configured to identify the beginning of a transmission netflow for at least one of the one or more groupings as a first synchronize (SYN) transmission control protocol (TCP) packet is received for each of the at least one of the one or more transmission netflows.

12. The system recited in claim 9, wherein:
    the netflow aggregator module is configured to identify the end of a transmission netflow when a subsequent finish (FIN) TCP packet is received for the transmission netflow.

13. The system recited in claim 1, wherein:
    a data stream includes telecommunication traffic via a communication network.

14. The system recited in claim 1, wherein:
    the parallel processor is configured as a network edge computing device.

15. A method for processing data streams, the method comprising:
    generating a storage representation for at least one of one or more data packets, wherein:
        each storage representation of a data packet includes segments of information about the data packet; and
        at least one of the segments of information about the data packet is information about a communication protocol specification related to the data packet;
    generating a composite index that identifies a data packet association characteristic for each of the one or more data packets and storing the composite index in one or more segments of the storage representation of that data packet, the generating and storing of the composite index occurring in parallel;
    grouping data packets by their composite index, the grouping occurring in parallel;

generating a session flow identifier for each grouping by identifying a beginning and/or an end of a transmission netflow for each of the one or more groupings; and aggregating and ordering the data packets having the same session flow identifiers into a flow channel, the aggregating and ordering occurring in parallel.

16. The method recited in claim 15, the generating the storage representation comprising:

generating one or more tables, wherein a segment of information about a data packet is stored in one or more intersections of one or more rows and one or more columns.

17. The method recited in claim 16, the aggregating and ordering comprising:

sorting the table by composite index and session flow identifier.

18. The method recited in claim 16, wherein:

the communication transmission protocol comprises TCP and the ordering comprises identifying whether a synchronize (SYN) transmission control protocol (TCP) packet bit or a finish (FIN) TCP packet bit is present for at least one of the one or more data streams.

19. The method recited in claim 15, wherein:

grouping the data packets involves grouping at least one of the one or more data packets having the same composite index.

20. The method recited in claim 15, comprising:

identifying a communication node pair between which at least one of the one or more data packets is transmitted and generating a composite index that is stored in the data representation of the at least one of the one or more data packets of the communication node pair regardless of transmission direction.

* * * * *